INVENTOR.
DAVID S. WILLARD
BY Harry A. Herbert Jr. and George Fine
ATTORNEYS

INVENTOR.
DAVID S. WILLARD
BY Harry A. Herbert Jr.
George Fine
ATTORNEYS

United States Patent Office 3,287,495

Patented Nov. 22, 1966

3,287,495

APPARATUS FOR ELIMINATION OF NOISE AND FAINT OBJECTS FROM A VIDEO SIGNAL

David S. Willard, High Rolls, N. Mex., assignor to the United States of America as represented by the Secretary of the Air Force Filed Apr. 12, 1965, Ser. No. 447,583
2 Claims. (Cl. 178—7.1)

The invention described herein may be manufactured and used by or for the United States Government for governmental purposes without payment to me of any royalty thereon.

The present invention relates to a star and satellite observation system including apparatus for time base element comparison, and more particularly, to a system utilizing a television type pick-up tube for sensing the light of the target and uses digital techniques to achieve sensitivity to a desired minimum star brightness thereby rejecting both electrical noise and signals from undesired faint objects to accomplish optimum signal to noise selection.

In star and satellite observations using television techniques, minimum horizontal image width, referred to hereafter as element, is desirable for the electronic rejection of both electrical noise and elimination of undesired faint objects such as faint stars.

This invention utilizes digital techniques to accomplish this result, by element to element comparison. It furthermore allows the capability of varying the width of the minimum video element accepted to accomplish optimum signal to noise selection or selection of minimum star brightness to be observed. Two element comparison systems, as described herein, can be connected in series to accomplish both results.

An object of the present invention is to provide an apparatus for electronic rejection of both electrical noise and elimination of undesired faint objects such as stars;

Another object of the present invention is to provide apparatus to vary the width of the minimum video element accepted to accomplish optimum signal to noise selection; and Still another object of the present invention is to provide apparatus to vary the width of the minimum video element accepted for selection of minimum star brightness to be observed.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated and described a preferred embodiment of the invention.

Figure 2:
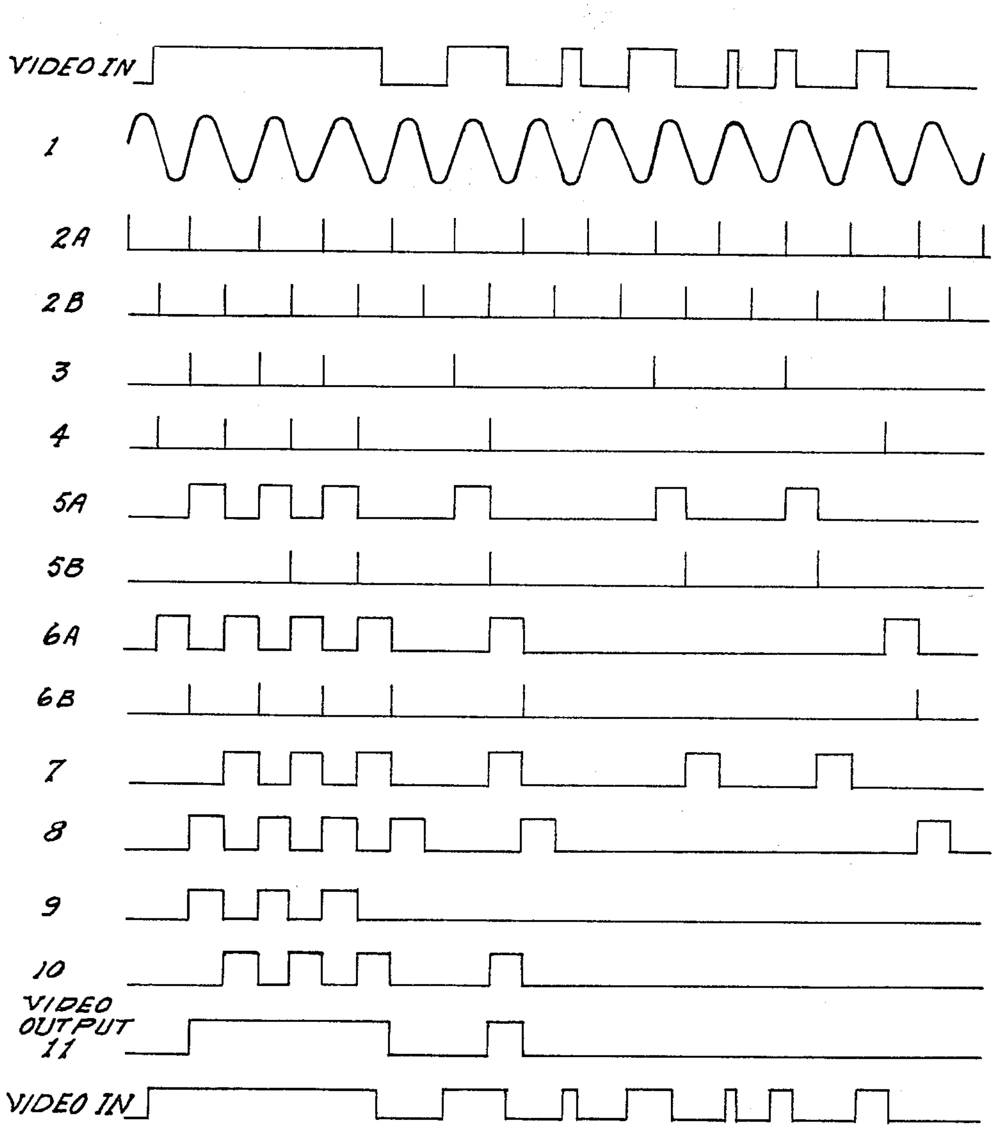
FIGURE 2 illustrates the waveforms associated with FIGURE 1.

In reference to FIGURE 2, polarities and amplitudes are disregarded. In all waveforms excepting sine wave 1 the lower level is "off," the higher level "on."

Figure 1:
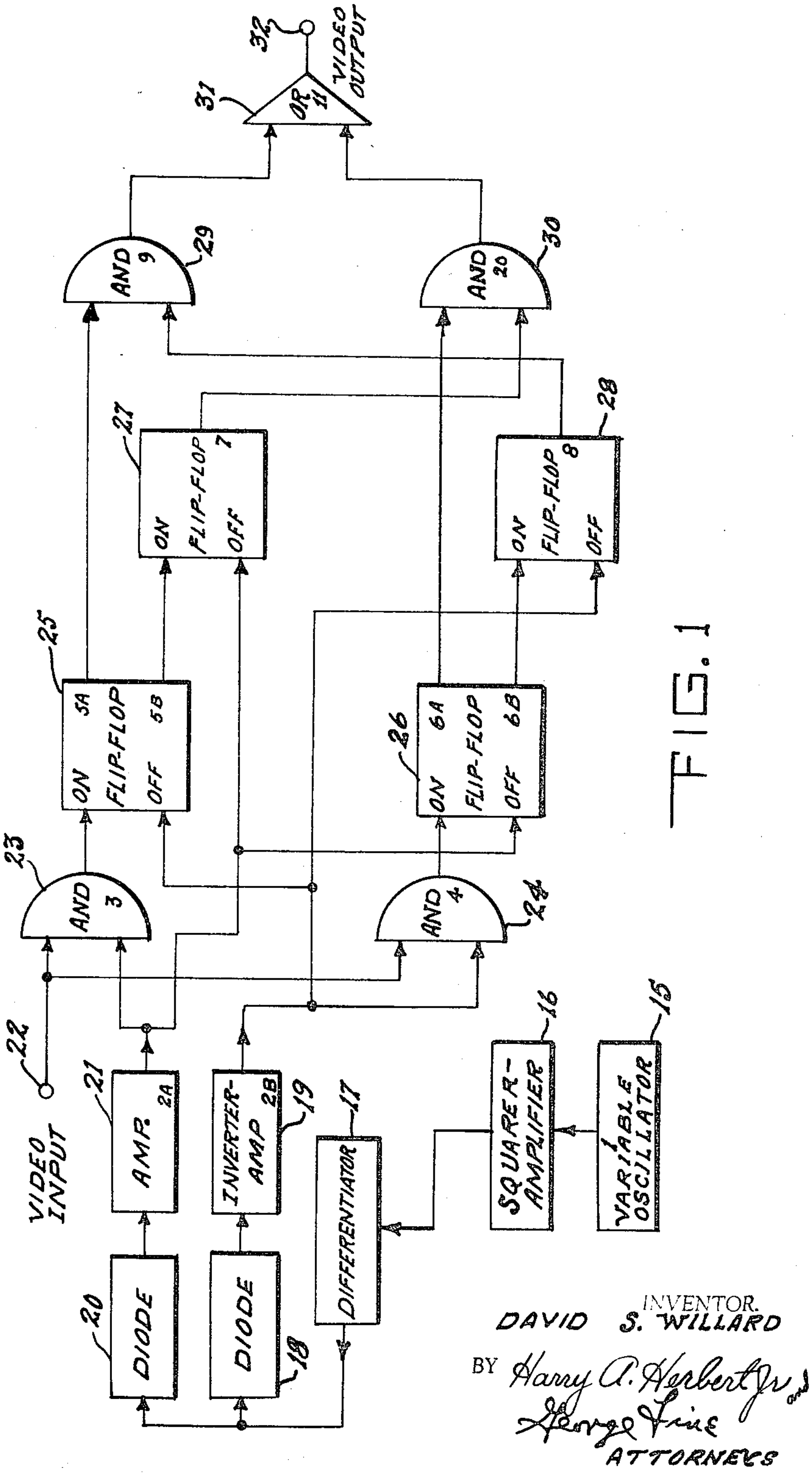
FIGURE 1 is a block diagram of a preferred embodiment of the invention.

Now referring in detail to FIGURE 1, there is shown variable frequency oscillator 18 which generates a sine wave signal whose frequency may be adjusted in accordance with the incoming video signal received at terminal 22. The sine wave signal is available at output 1 of oscillator 15 and is shown as waveform 1 of Figure 2. Sine wave signal 1 is fed to squarer and amplifier 19. The squarer may be any conventional diode or triode clipping circuit. The squarer signal is also amplified therein and then passed to differentiator 17. The output of differentiator 17 is in the form of positive and negative pulses which are representative of positive and negative crossings, respectively, of zero of the sine wave signal. Diode 20 is arranged to pass only positive going pulses and diode 18 only negative going pulses. Amplifier 21 provides amplified positive pulses at its output 2A (illustrated as waveform 2A, FIGURE 2) which is representative of positive crossings of zero of the original sine wave signal and inverter-amplifier 19 provides amplified positive pulses at its output 2B (illustrated as waveform 2B, FIGURE 2) which are representative of the negative crossings of zero of the original sine wave signal.

The video input signal received at terminal 22 is provided, for example, by television techniques in which transmitting type camera system such as the image orthicon and vidicon whose purpose is to translate light intensity variations of objects in space to electrical signal output in the form of video signals. These video signals are shown in FIGURE 2 as the waveform labeled VIDEO IN. The video input is received at terminal 22 and fed to AND gates 23 and 24 respectively. AND gate 23 also receives from output 2A positive pulses representative of positive crossings of the original sine wave signal which produce a coincident signal at output 3 which is illustrated as waveform 3 of FIGURE 2. AND gate 24 also receives from output 2B positive pulses representative of negative crossings of the original sine wave to produce a coincident signal at output 4 which is illustrated as waveform 4 of FIGURE 2.

Flip-flop circuit 25 receives two input signals, one being from output 3 and the other from output 2B to produce controlled width elements at output 5A shown as waveform 5A in FIGURE 2. Flip-flop circuit 26 also receives two input signals, one being from output 4 and the other from output 2A to produce from output 6A alternate controlled elements shown as waveform 6A in FIGURE 2. Output waveform 5B of flip-flop 25 which occurs at the instant to "off" of elements in waveform 5A, combines in flip-flop circuit 27 with pulse waveform 2A to form at output 7 the waveform 7 illustrated in FIGURE 2. This waveform 7 is identical to waveform 5A excepting that it is delayed by one element.

Pulses of waveform 6B which occurs at the instant to "off" of elements of waveform NA, combines in flip-flop circuit 28 with pulses of waveform 2B to form at output 8 waveform 8 as illustrated in FIGURE 2. Pulses of waveform 8 are identical to those of waveform 6A excepting delayed by one element. Element comparison, which eleminates any signal that does not have a duration of at least two consecutive elements, occurs in AND circuits 29 and 30 having outputs 9 and 10, respectively. These signals from outputs 9 and 10 are shown as waveform 9 and 10, respectively, in FIGURE 2. Waveforms 9 and 10 are combined in "OR" circuit 31 which provides at output 11 waveform 11 illustrated in FIGURE 2. The output from the apparatus of the present invention is provided by terminal 32.

What is claimed is:

1. In an apparatus for electronic rejection of both electrical noise and elimination of undesired faint objects such as faint stars comprising a video input signal from which said electrical noise is to be eliminated, an oscillator generating a sine wave signal of preselected frequency, means to generate two sets of pulses, the first set of pulses being representative of positive crossings from zero, one crossing being of said sine wave signal and the second set of negative crossings, first and second AND gates, each having two inputs, said first AND gate receiving said video signal and said first set of pulses to provide first coincident output pulses and said second AND gate receiving said video signal and said second set of pulses to provide second coincident output pulses, first and second flip-flop circuits, each having two inputs and two outputs, said first flip-flop circuit receiving said first coincident pulses and said second set of pulses to provide at one of said outputs controlled width element signals and at the other of said outputs a pulse signal representative of the "off" position of each of said controlled width element signals, said second flip-flop circuit receiving said second coincident pulses and said first set of pulses to provide at one of said outputs alternate controlled width element signals and at the other of said output pulses representative of the "off" position of said alternate controlled width element signals, third and fourth flip-flop circuits, each having two inputs and one output, said third flip-flop circuit receiving said first set of pulses and said pulses representative of the "off" position of said controlled width element signals to provide an output signal identical to said controlled width element signals however being delayed one element, said fourth flip-flop circuit receiving said second set of pulses and said pulses representative of the "off" position of said alternate controlled width element signals to provide an output signal identical to said alternate controlled width element signal however being delayed one element, third and fourth AND gates, each having two inputs and one output, said third AND gate receiving said controlled width element signal and said output signal from said fourth flip-flop circuit, said fourth AND gate receiving said alternate controlled width element signal and said output signal from said third flip-flop circuit, and an OR circuit receiving simultaneously the output signals from said third and fourth AND gates to provide an output video signal free of electrical noise.

2. In an apparatus for electronic rejection of both electrical noise and elimination of undesired faint objects such as faint stars as in claim 1 wherever said means to generate two sets of pulses is comprised of means to square and amplify said sine wave signal, means to differentiate said amplified signal, diode means to pass only positive pulses of said differentiated signal, and diode means to pass only negative pulses of said differentiated signal.

No references cited.

DAVID G. REDINBAUGH, *Primary Examiner.*

J. McHUGH, *Assistant Examiner.*